(12) United States Patent
Lammers

(10) Patent No.: US 10,556,612 B2
(45) Date of Patent: Feb. 11, 2020

(54) METHOD, TOOL, AND TOOL ASSEMBLY FOR INTRODUCING AN ELECTRICAL CONDUCTOR INTO A FOAM CLADDING OF A STEERING WHEEL FRAME, AND VEHICLE STEERING WHEEL

(71) Applicant: TRW Automotive Safety Systems GmbH, Aschaffenburg (DE)

(72) Inventor: Alexander Lammers, Mühltal (DE)

(73) Assignee: TRW AUTOMOTIVE SAFETY SYSTEMS GMBH, Aschaffenburg (DE)

( * ) Notice: Subject to any disclaimer, the term of this patent is extended or adjusted under 35 U.S.C. 154(b) by 399 days.

(21) Appl. No.: 15/028,984

(22) PCT Filed: Oct. 20, 2014

(86) PCT No.: PCT/DE2014/000526
§ 371 (c)(1),
(2) Date: Apr. 13, 2016

(87) PCT Pub. No.: WO2015/055172
PCT Pub. Date: Apr. 23, 2015

(65) Prior Publication Data
US 2016/0236702 A1    Aug. 18, 2016

(30) Foreign Application Priority Data
Oct. 18, 2013 (DE) .......................... 10 2013 017 319

(51) Int. Cl.
*B29K 105/20*  (2006.01)
*B29C 44/12*  (2006.01)
(Continued)

(52) U.S. Cl.
CPC ................ *B62D 1/06* (2013.01); *B26D 3/08* (2013.01); *B26D 7/0006* (2013.01); *B26D 7/086* (2013.01);
(Continued)

(58) Field of Classification Search
CPC ............ B60R 13/0206; B29C 44/1271; B29C 44/1233; B29C 44/1228; B29C 44/1214;
(Continued)

(56) References Cited

U.S. PATENT DOCUMENTS

2002/0008097 A1* 1/2002 Hobby .................. B62D 1/065
219/204
2002/0036191 A1* 3/2002 Bonn .................... B62D 1/065
219/204

(Continued)

FOREIGN PATENT DOCUMENTS

DE         845163       7/1949
DE        19910132      3/2000
DE        10111448      9/2002

*Primary Examiner* — Ryan J. Walters
*Assistant Examiner* — Lawrence Averick
(74) *Attorney, Agent, or Firm* — Tarolli, Sundheim, Covell & Tummino LLP

(57) ABSTRACT

A method of introducing an electric conductor (22), especially a heating wire, into foam padding (20) of a steering wheel skeleton (18) includes introducing at least one cut (26) into the foam padding (20) by means of a cutting tool (34). At the same time the conductor is introduced into the produced cut (26). Moreover a tool as well as a tool assembly for implementing the method and a vehicle steering wheel are provided.

28 Claims, 15 Drawing Sheets

(51) Int. Cl.
  *B29C 70/08* (2006.01)
  *B62D 1/06* (2006.01)
  *B26D 3/08* (2006.01)
  *B26D 7/00* (2006.01)
  *B26D 7/08* (2006.01)
  *B26D 7/26* (2006.01)
  *B26D 7/27* (2006.01)

(52) U.S. Cl.
  CPC ......... *B26D 7/2614* (2013.01); *B26D 7/2628* (2013.01); *B26D 7/27* (2013.01)

(58) Field of Classification Search
  CPC ..... B29C 70/86; B29C 70/086; B29C 44/146; B29C 2793/0081; B29B 11/04; B29B 11/06; B29K 2105/20; B29K 2701/12; B29K 2715/00; B29K 2995/0082; B29K 2101/10; B29K 2105/00
  See application file for complete search history.

(56) References Cited

U.S. PATENT DOCUMENTS

| | | | |
|---|---|---|---|
| 2004/0155020 A1* | 8/2004 | Worrell | H05B 3/48 219/204 |
| 2011/0056930 A1* | 3/2011 | Letzas | B62D 1/065 219/546 |
| 2013/0056455 A1* | 3/2013 | Onishi | B62D 1/065 219/204 |
| 2015/0122790 A1* | 5/2015 | Yamada | B62D 1/065 219/204 |
| 2016/0236702 A1* | 8/2016 | Lammers | B26D 3/08 |

* cited by examiner

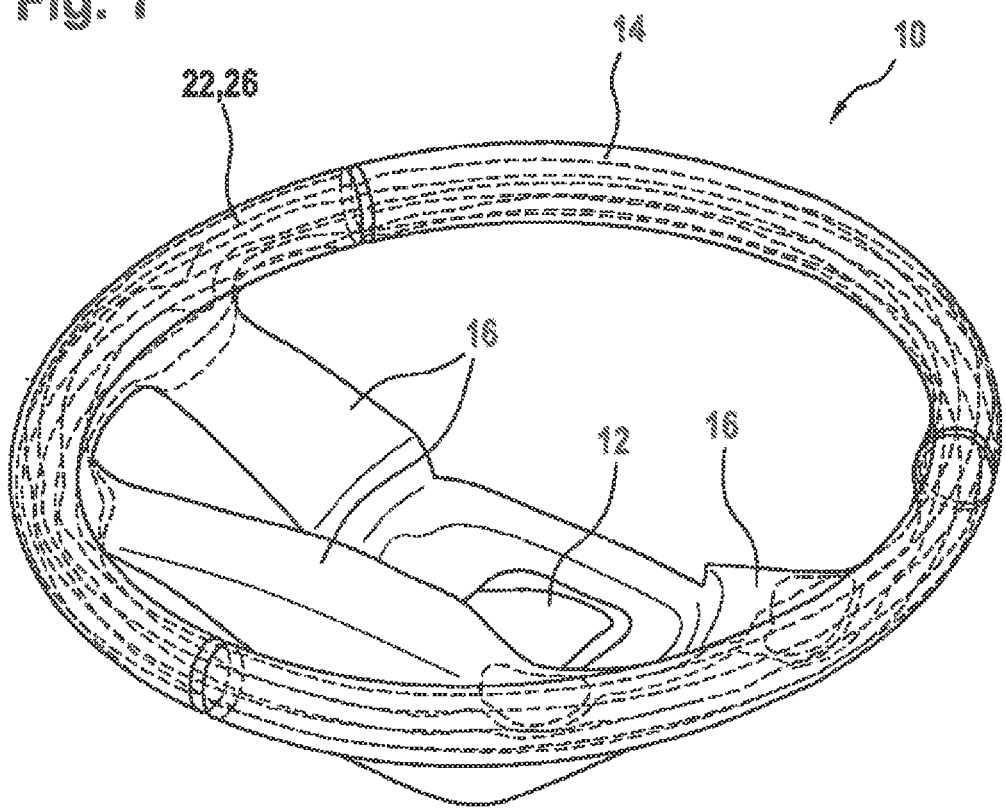

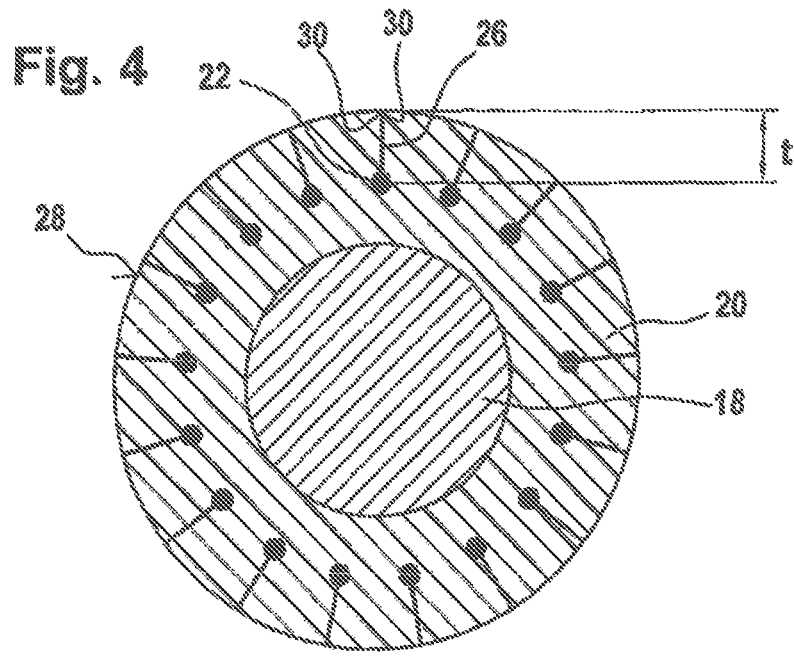
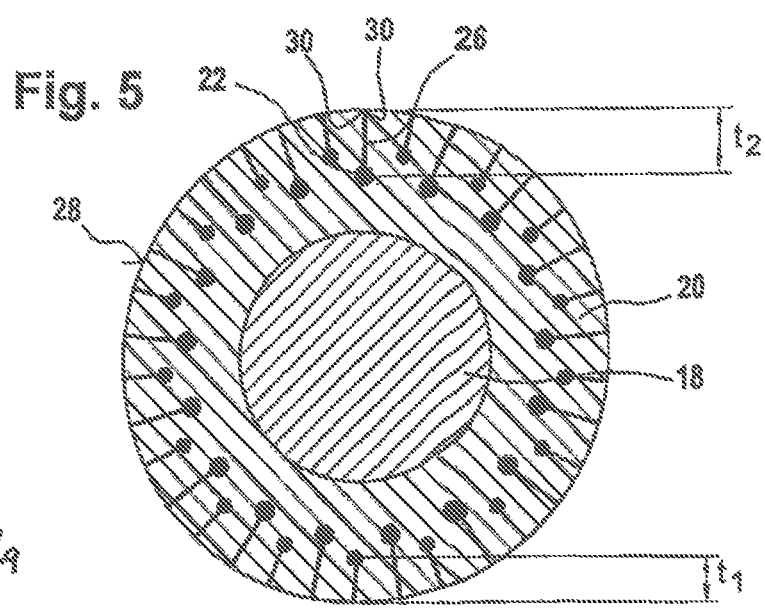
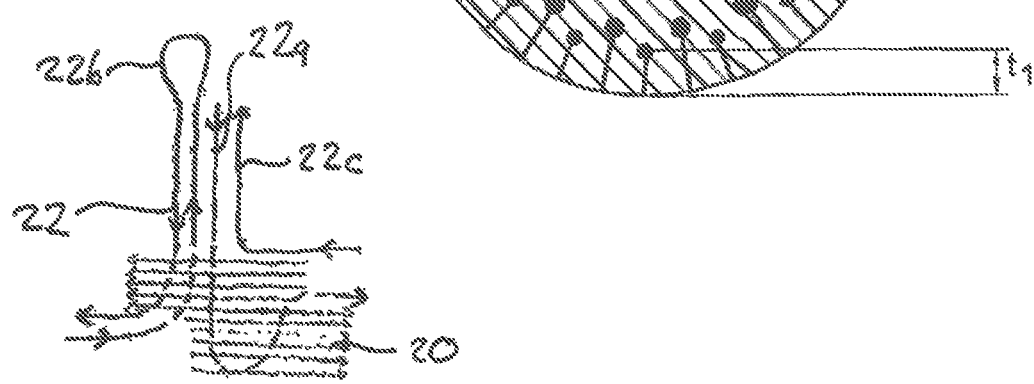

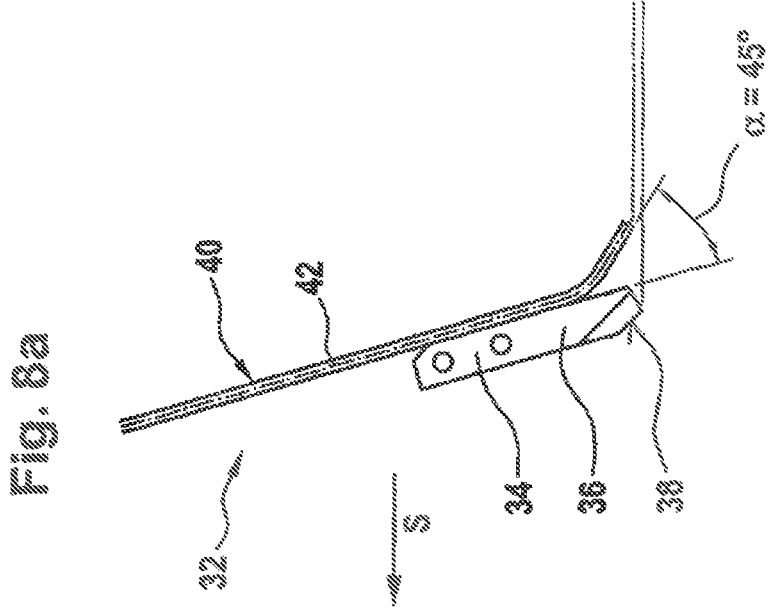

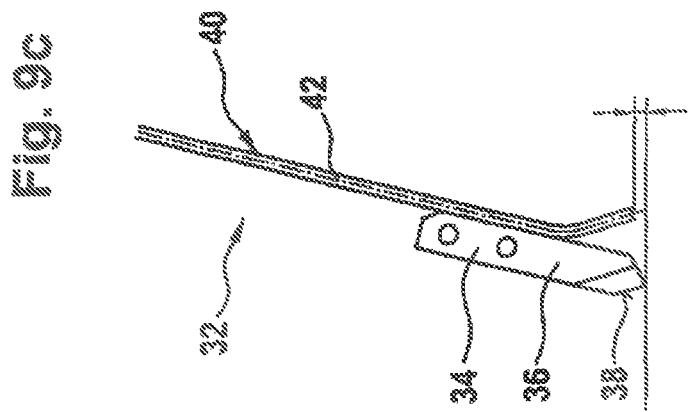
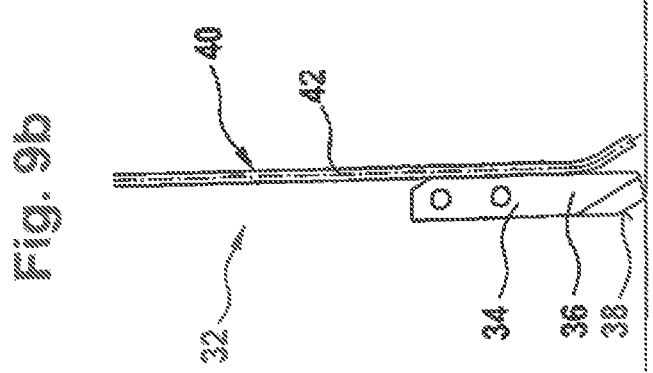
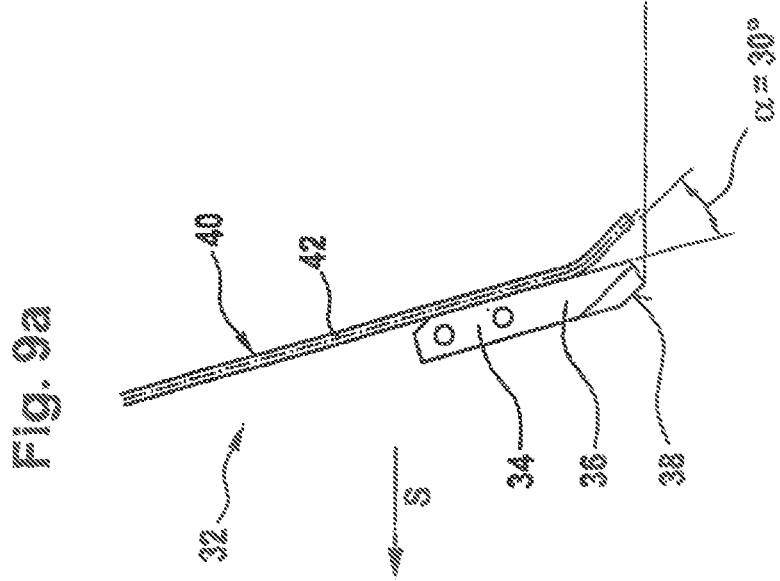

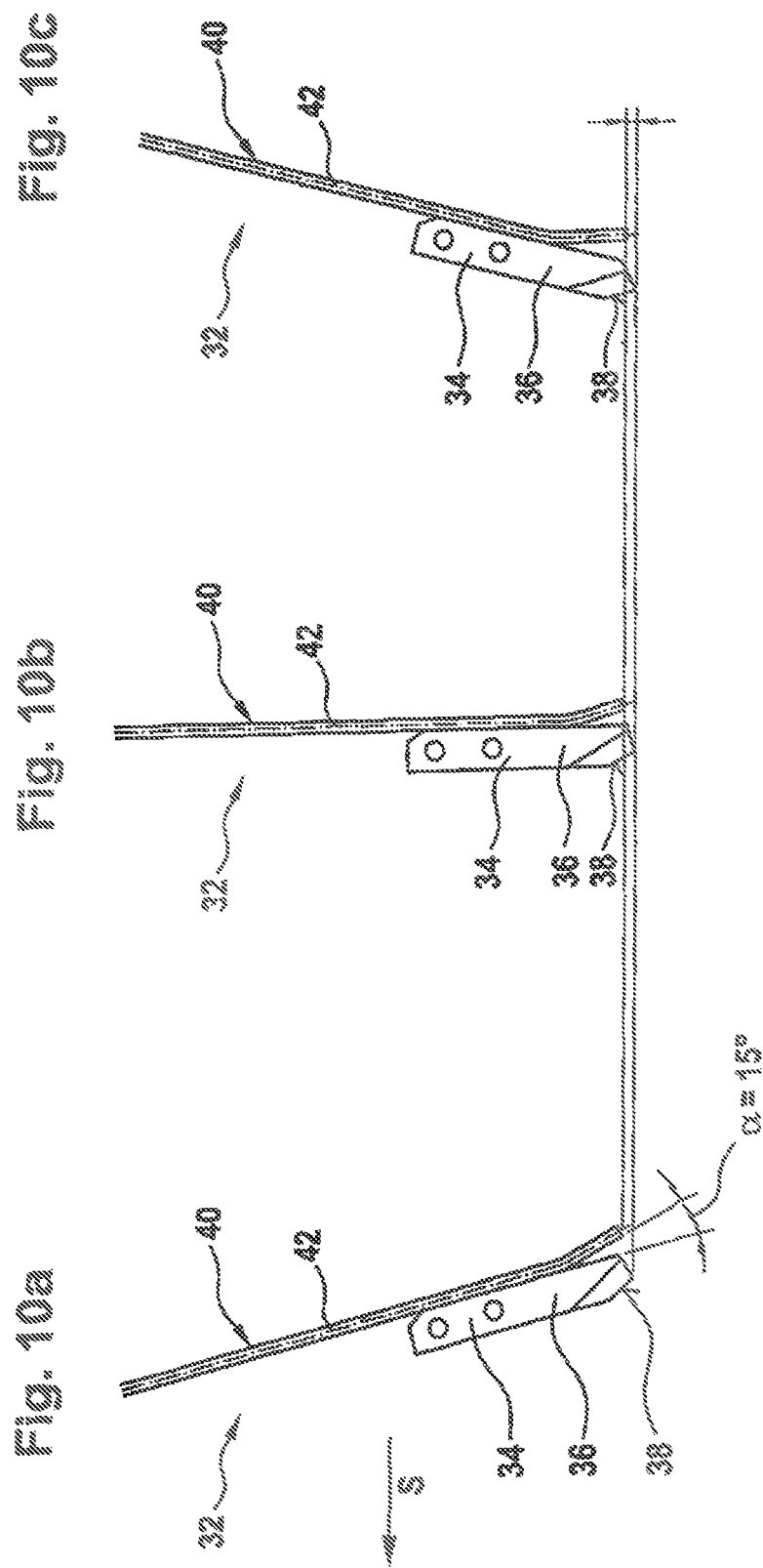

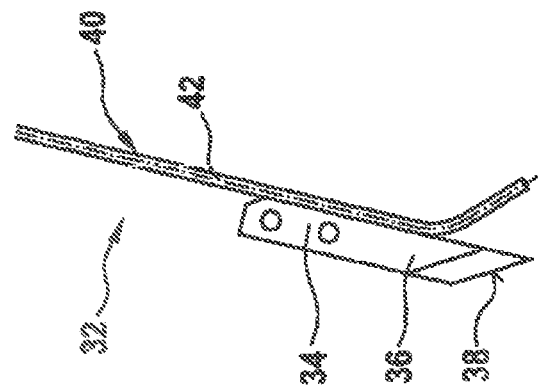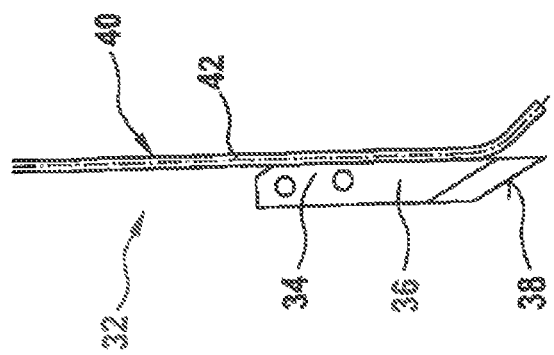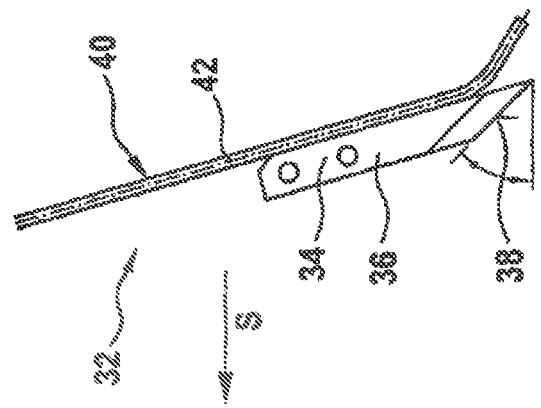

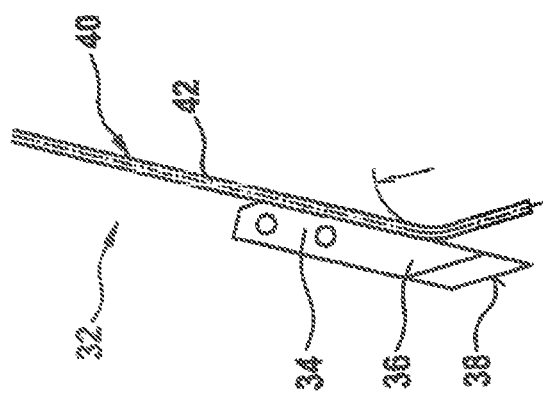
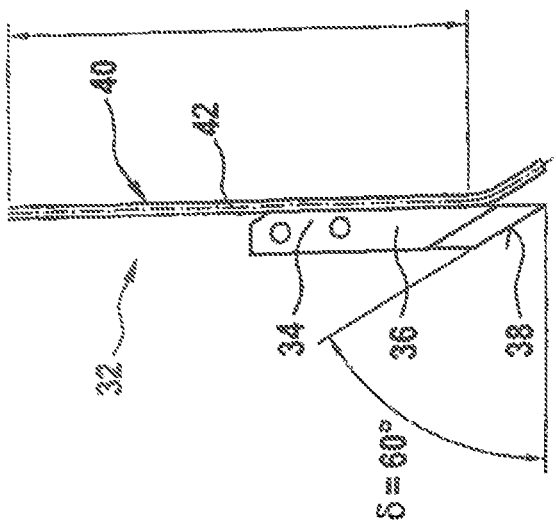
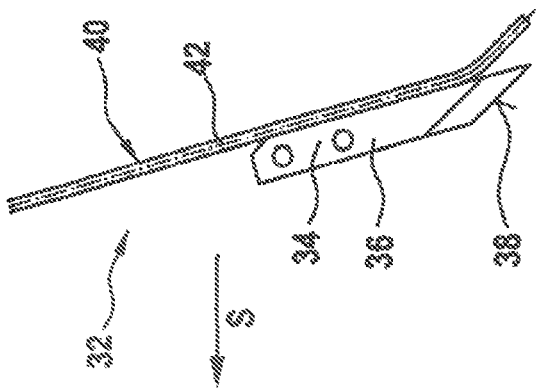

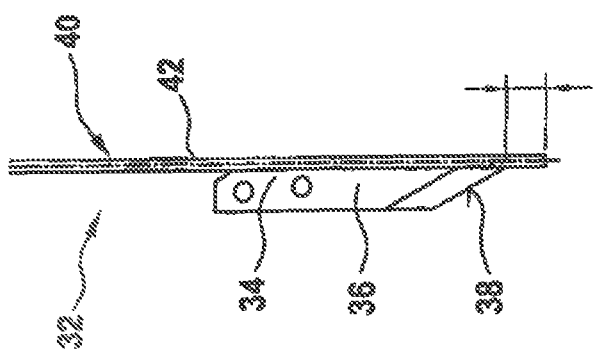
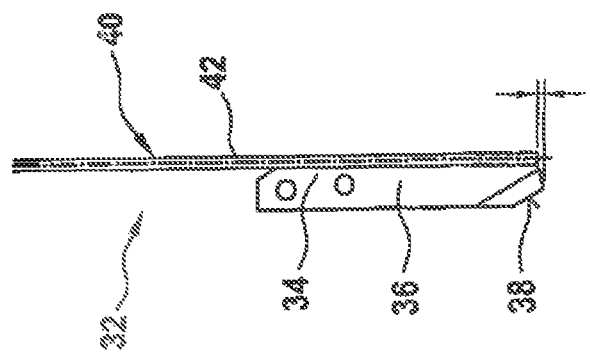
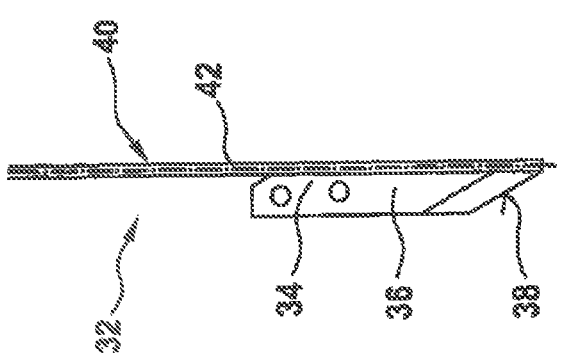

METHOD, TOOL, AND TOOL ASSEMBLY FOR INTRODUCING AN ELECTRICAL CONDUCTOR INTO A FOAM CLADDING OF A STEERING WHEEL FRAME, AND VEHICLE STEERING WHEEL

RELATED APPLICATIONS

This application corresponds to PCT/DE2014/000526 (filed Oct. 20, 2014, which claims the benefit of German Application No, 10 2013 017 318.1, filed Oct. 18, 2013, the subject matter of which are incorporated harem by reference in their entirety.

BACKGROUND OF THE INVENTION

The invention relates to a method, a tool and an assembly for introducing an electric conductor, especially a heating wire, into foam padding of a steering wheel skeleton. Furthermore, the invention relates to a vehicle steering wheel.

For reasons of comfort, vehicle steering wheels frequently include a steering wheel heating formed by a plurality of electric heating wires arranged in the foam padding of the steering wheel skeleton of the vehicle steering wheel. In order to achieve high and efficient heating output, the heating wires have to be arranged at preferably small depth in the foam padding of the steering wheel skeleton. On the other hand, the heating wires have to be reliably retained in the foam padding so as to prevent the wires from getting out of place. It is moreover required to ensure uniform heating of the vehicle steering wheel that the heating wires are arranged at a constant depth within the foam padding of the steering wheel skeleton. By the previously known methods it is very time-consuming and labor-intensive to uniformly introduce the electric conductor into the foam padding.

Moreover, electric conductors, i.e. wires, are also integrated in the steering wheel as part of sensor means.

SUMMARY OF THE INVENTION

It is the object of the invention to provide a method of introducing an electric conductor, especially a heating wire, into foam padding of a steering wheel skeleton which enables the electric conductor to be quickly and evenly laid. It is another object of the invention to provide a tool and a tool assembly to be able to lay an electric conductor evenly and quickly in foam padding of a steering wheel skeleton. It is another object of the invention to provide a steering wheel comprising such electric conductor.

In order to achieve the object a method of introducing an electric conductor, especially a heating wire, into foam padding of a steering wheel skeleton is provided comprising the following steps of:
  introducing a out into the foam padding by means of a cutting tool, and
  at the same time introducing the conductor info the produced cut.
In the previously known methods the electric conductor is glued onto the foam padding.

In accordance with the invention, the electric conductor is introduced into said cut simultaneously with introducing the cut so that no additional working step is required to bend, for example, the cut edges apart again for inserting the conductor. Hence the cut and the conductor are introduced in a common working step, which enables substantially quicker and more efficient insertion of the conductor. The electric conductor that may be a wire, a band or a bundle of plural strands is inserted into the just produced cut, while the fool for producing the cut continues moving and extends the cut. Consequently, the conductor immediately tracks the cutting tool and only has a distance of few millimeters from the cutting edge. Thus the cutting tool precedes the inserted portion of the conductor by few millimeters, wherein, however, the cutting operation and the introducing operation are carried out simultaneously, merely minimally offset against each other in space.

Cutting is preferably carried out without any material removal, i.e. merely a singular cut is produced in the foam padding but no groove is cut out.

Preferably the conductor is introduced before the cutting edges of the out forced apart when introducing the cut join each other again. The cutting edges are elastically forced apart when the cut is introduced by the cutting tool and elastically return to their initial position after the cutting tool is advanced or removed. The electric conductor is inserted before the forced-apart cutting edges are adjacent to each ether again so that it is not necessary to bend the cutting edges apart again. After the cutting edges are adjacent to each other again, they protect the conductor from external strains and from falling out of the cut.

Due to the elastic properties of the foam padding the out preferably closes automatically after inserting the conductor so that the conductor is safely held and protected. In addition, it is possible that the cut is actively closed and/or covered after inserting the conductor. This may be effectuated by integral bonding, for instance gluing of the cutting edges.

According to a preferred embodiment the conductor/wire includes a thin thermoplastic adhesive coating. The latter may be activated by means of current supply/heating, which additionally fixes the wire. By heating the glue the cutting edge can be closed again.

The conductor may be integrally bonded to the foam padding after insertion also in a different manner, for example by a smart bond method.

According to another preferred embodiment the conductor is provided to be fixed in the foam padding by short-time heating and subsequent cooling. In this method heating is preferably carried out to a temperature within the range of the melting temperature of the foam padding, of preference to a temperature >130° C.

It is preferred in this case that current is supplied to the conductor at about 10-50 V for 5 to 60 seconds, especially 10 to 30 seconds.

In this way a vehicle steering wheel according to the invention can be provided comprising a steering wheel skeleton, a steering wheel rim foam-padded by foam padding and an electric conductor, wherein into the foam padding a cut is introduced in which the electric conductor is located and wherein the electric conductor is fixed in the foam padding, especially by melting.

It is also possible, however, that after inserting the conductor the foam padding is covered by further foam padding or a wrapping. The wrapping may be, for example, a gripping surface for the vehicle steering wheel, e.g. made of fabric, leather or artificial leather. Since the conductor is safely supported within the out in the foam padding, reliable support and fixation of the conductor is ensured in the foam padding independently of any further foam padding or wrapping.

The conductor can be laid in the foam padding corresponding to the respective desired heating properties. Preferably the at least one cut substantially extends, viewed in a top view, in the circumferential direction around the steering wheel hub along the steering wheel rim. This facilitates cutting of the foam material by a tool or an industrial robot, as the latter has to be moved merely along the steering wheel rim but not around the steering wheel rim, viewed in a radial section.

In order to guarantee uniform and sufficient heating output of the electric conductor as well as safe restraint of the conductor within the cut the cut has a depth of at least 0.1 mm, preferably of at least 0.5 mm, especially of at least 1 mm, and/or preferably a depth of no more than 9 mm, preferably of no more than 5 mm, further preferably of no more than 3 mm, especially of no more than 2 mm.

According to a further embodiment, it is suggested that the cut depth amounts to 0.8 to 10.5 times, especially 1.0 times to 1.5 times the wire diameter.

For achieving a preferably uniform heating of the vehicle steering wheel electric conductors or conductor portions are preferably provided along the entire periphery of the steering wheel rim. For this purpose, plural short electric conductors can be introduced into the foam padding. However, it is also possible that a longer electric conductor which is guided around the steering wheel rim several times is introduced into the steering wheel skeleton. Preferably two longer electric conductors are introduced to the steering wheel rim, one of which is arranged (substantially) on the front side (facing a driver) and a second of which is arranged (substantially) on the rear side (facing the instrument panel, turned away from the driver). In these embodiments the cut is preferably guided along the steering wheel rim in plural revolutions around the steering wheel hub so that a substantially spiral cut is produced and the conductor extends in plural windings and/or the cutting depths are different in the point of intersection in the case of intersecting cuts.

The cut and the introduction of the conductor are made preferably by means of a tool mounted on an at least three-axle freely programmable industrial robot operating the tool. By such freely programmable industrial robot free selection of the cutting is possible. Moreover, reliable and uniform cutting is ensured due to the high accuracy of said industrial robots.

In order to permit more complicated cuttings. In addition or optionally also the steering wheel skeleton may be held on a second at least three-axle freely programmable industrial robot which moves the steering wheel skeleton relative to the tool.

For achieving the object moreover a tool for introducing an electric conductor, especially a heating wire, into foam padding of a steering wheel skeleton is provided, especially for carrying out a method according to the invention, the tool including a cutting tool having a cutting means which includes a cutting edge pointing to a cutting direction as well as an introducing tool for the conductor, wherein the cutting tool and the introducing tool are coupled to each other and the introducing tool is preferably directly connected to the cutting means against the cutting direction.

The introducing tool is arranged in the cutting direction just behind the cutting means and, resp., the cutting tool so that the electric conductor can be inserted into the cut simultaneously with or directly after introducing the out to the foam padding, in particular before the cutting edges of the cut which are forced apart by the cutting means when introducing the cut join each other again.

In accordance with the invention, (thus) simultaneous introduction of the electric conductor is possible in one working step.

For protecting the electric conductor during insertion, the inserting tool may have an outlet in the form of a trumpet mouthpiece.

For keeping the cutting edges open, i.e. distant from each other, between the cutting tool and the electric conductor furthermore an intermediate part may be used for keeping the just produced cut open until the corresponding portion of the electric conductor then reaches the just produced cutting point upon advancing.

The width of the inserting tool perpendicularly to the cutting direction is preferably smaller than the width of the cutting means so that the cut is not additionally forced apart by the inserting tool. The resistance of the tool when being guided in the cut thus is very small as the inserting tool does not contact the cutting surfaces, in a different embodiment the width of the inserting tool corresponds to the width of the cutting means.

The inserting tool may include, for example, an inserting passage through which the conductor can be guided, the inserting passage ending in the cutting direction behind the cutting means of the cutting tool. The conductor can be introduced into the cut by said inserting passage with low resistance. Since the conductor cannot get into contact with the cutting edges, moreover damage of the cutting edges is reliably excluded by the conductor.

The cutting tool protrudes from the inserting tool e.g. perpendicularly to the cutting direction by a precutting depth so that behind the cot a larger free space is provided into which the electric conductor may be inserted. Said precutting depth preferably ranges from 0.1 mm to 2 mm.

The cutting tool and the inserting tool may be integrally connected, for example welded, glued or soldered to each other. It is imaginable, however, that they are positively and/or non-positively interconnected, for example also via an adapter. Said adapter also permits a variable adjustment of the precutting depth.

In order to facilitate threading of the electric conductor the inserting tool may include an especially conically tapering guide in an inserting aid of the electric conductor.

The open end of the inserting passage is arranged and aligned, for example, so that the electric conductor exits the inserting passage into the out in the desired position and orientation as well as in the desired depth. The passage may be directly adjacent, for example in portions, to the rear of the cutting means so that it can be guided in the out behind the cutting means with low resistance.

For ensuring better insertion of the electric conductor into the cut the inserting passage is bent away, for example, from the rear of the cutting means, especially at an angle of 15° to 45° relative to the rear of the cutting means. Preferably the inserting passage is bent so that the open end arranged within the cut is bent away from the cutting means to the rear so that the electric conductor can exit the inserting passage against the cutting direction and already has the desired orientation within the cut during exit from the inserting passage. In this way it is preferred that the wire is inserted at an injection angle of from 45° to 90°, especially of 75° with respect to the cutting direction.

The tool may additionally include a feeding system for the conductor by which the electric conductor is tracked, preferably at the speed of cutting, so that it can be inserted into the cut free of tension.

The supply may include, for example, a tube or hose shaped feed line for the electric conductor, e.g. a Teflon hose, having low friction.

The cutting tool may have any orientation of the cutting means and of the cutting edge which is suited to introduce a cut to the foam padding. An especially proper cutting is possible when the cutting edge exhibits an angle (cutting angle) of from 30° to 90°, especially of from 45° to 75° with respect to the cutting direction.

The cutting means is, for example, a blade having a cutting edge pointing to the cutting direction.

An especially proper cutting is possible in that the cutting tool is an ultrasonic cutting tool, i.e. is quickly deflected in small amplitudes in addition to the feeding motion.

Preferably the tool is pressed against the workplace, i.e. the steering wheel skeleton, at constant pressure so as to ensure uniform cutting, especially cutting depth. For this purpose, at the tool a pressing device is provided, for example, which is adapted to load the tool with a defined force, for instance a defined spring force, against a workpiece, usually a steering wheel skeleton and to compensate for tolerances in the workplace.

The pressing device is formed, for example, so that the pressure is adjustable or the pressing device can be locked.

For ensuring the desired cutting depth the cutting means may have a separate guide means for adjusting the cutting depth. The guide means is configured, for example, so that only the length of the cutting means required for the cutting depth of the cutting means is released. The released length of the cutting means may also be variable, for instance, during cutting.

The guide means is preferably pressed against the workplace by the pressing device and rests on the surface thereof. For this, the guide means includes a guide shoe adapted to be adjacent to the workplace (e.g. steering wheel skeleton), wherein the cutting means protrudes from said guide shoe into the workplace.

The guide means includes an actuating mechanism, for example, adapted to move the guide shoe relative to the cutting means so as to adjust the cutting depth, which may be done manually but also electrically.

According to the invention, furthermore a tool assembly is provided for introducing an electric conductor, especially a heating wire, into foam padding of a steering wheel skeleton, comprising a tool according to the invention and an industrial robot on which the tool is mounted and can be moved three-dimensionally in space. Preferably a control for the industrial robot is provided to be able to guide the tool with the desired cutting along the steering wheel skeleton. In addition, there may be provided a guide assembly which is adjacent to the steering wheel skeleton and ensures that the desired cutting depth is guaranteed. In another embodiment also a tactile or sensor-controlled spacing from the foam surface is imaginable.

Of preference, a second freely programmable industrial robot is provided on which the steering wheel skeleton is mounted and can be moved three-dimensionally in space.

Moreover there may be provided a positioning means for the electric conductor which may be positioned on the steering wheel skeleton and includes a seat for an electric connection arranged on the steering wheel skeleton for the electric conductors as well as retaining elements for the start and the end of the electric conductor.

The positioning means includes e.g. guide elements for the electric conductor. The guide elements may be deflection elements around which the electric conductor may be laid or hold-downs which prevent the electric conductor from being pulled out upon contacting an electric connection or upon cutting off the electric conductor.

The positioning means further may include a fastening device and positioning aids for fixing the positioning means to the steering wheel skeleton.

In addition, a cutting tool for the electric conductor associated with the retaining element for the end of the electric conductor may be provided to cut off the electric conductor after laying the same.

In order to achieve the object furthermore a vehicle steering wheel comprising a steering wheel skeleton, a steering wheel rim that is foam-padded and an electric conductor is provided, wherein a cut in which the electric conductor is located is introduced to the foam padding. The electric conductor is introduced to the foam padding especially by a method according to the invention.

A first layer of windings is said, for example, at a first depth and a second layer of windings is laid at another second depth, wherein especially the windings of the first layer are offset against the windings of the second layer.

The cut may also have points of intersections of portions of the out, wherein in the area of the intersections one of the intersecting portions of the cut has a larger depth and the electric conductor in this portion of the cut is inserted more deeply than in the overlying portion.

The vehicle steering wheel according to the invention may be covered in the area of the cut or in total to the outside, for example by means of a further foam padding or wrapping, e.g. made of fabric, natural leather, artificial leather or wood.

Moreover, in a vehicle steering wheel according to the invention the cut extends substantially in the circumferential direction around the steering wheel hub (viewed in top view) along the steering wheel rim.

The out may extend in plural revolutions around the steering wheel hub so that it has a spiral shape. The conductor or conductors extend(s) in plural windings in the foam padding.

It s emphasized that by the term "foam padding" the steering wheel skeleton need not necessarily be inserted in a foaming tool and be embedded in foam. It would also be possible to separately produce the foam padding and glue it onto the steering wheel skeleton.

The vehicle steering wheel according to the invention may include the same features which have been explained before in connection with the method of manufacturing the same.

BRIEF DESCRIPTION OF THE DRAWINGS

Further advantages and features are found in the following description in connection with the enclosed drawings in which:

FIG. 1 shows a perspective view of a vehicle steering wheel according to the invention manufactured according to the method of the invention including an electric conductor introduced to the foam padding, FIG. 4 shows a radial section across the steering wheel rim of the vehicle steering wheel of FIG. 1, FIG. 5 shows a radial section across a second embodiment of a steering wheel rim of a vehicle steering wheel, FIG. 6 shows a detailed view of the vehicle steering wheel of FIG. 5 in a section.

FIGS. 9a to 9c show different views and orientations of a third embodiment of a tool according to the invention for introducing an electric conductor, FIGS. 10a to 10c show different views and orientations of a fourth embodiment of a tool according to the invention for introducing an electric conductor, FIGS. 11a to 11c show different views and orientations of a fifth embodiment of a tool according to the invention for introducing an electric conductor, FIGS. 12a to 12c show different views and orientations of a sixth embodiment of a tool according to the invention for introducing an electric conductor, FIGS. 14a to 14c show different views and orientations of an eighth embodiment of a tool according to the invention for introducing an electric conductor.

DESCRIPTION

Figure 2A:
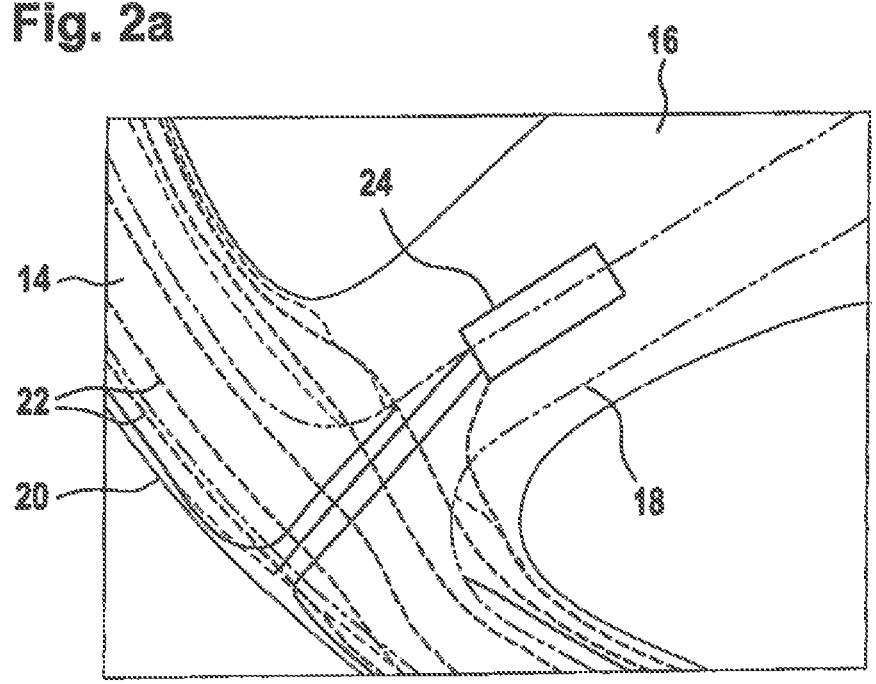
FIGS. 2a and 2b show detailed views of the vehicle steering wheel of FIG. 1 in the area of a steering wheel spoke, FIGS. 3a and b show further detailed views of the vehicle steering wheel of FIG. 1 in the area of a recess for receiving a steering wheel wrapping.
Figure 2B:
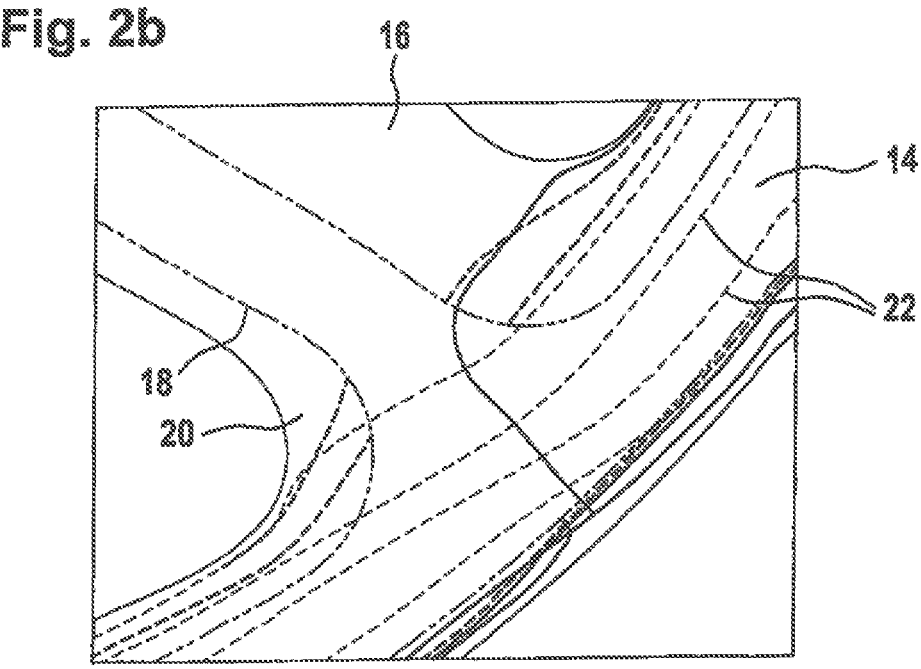

FIG. 1 illustrates a vehicle steering wheel 10 comprising a steering wheel hub 12, a steering wheel rim 14 and plural spokes 16 interconnecting the steering wheel hub 12 and the steering wheel rim 14. As is evident from FIGS. 2a and 2b as well as 3a and 3b, the vehicle steering wheel 10 includes a steering wheel skeleton 18 made of hard material (preferably a light metal alloy) as well as foam padding 20 which is made of soft elastic material and completely encloses the steering wheel skeleton 18 least in the area of the steering wheel rim 14 on the outside.

In the foam padding 20 one or more electric conductors 22 are provided which are connected to the power network of the vehicle by a connection 24 arranged at a spoke. The electric conductors 22 form heating wires which are heated by current supply and heat the vehicle steering wheel 10, especially the steering wheel rim 14.

As is evident in FIG. 1, the outs 26 are circularly guided around the steering wheel hub 12 along the steering wheel rim 14. There may be provided plural circular cuts 26 extending substantially in parallel to each other or one or more of said cuts can also be guided in plural revolutions around the steering wheel hub 12 along the steering wheel rim at a small distance from each other so that a substantially spiraled cut 26 is produced. When the conductor 22 is inserted into said spiraled cut 26, it extends in a plurality of winding. As a matter of course, it is advantageous when cuts are closer to each other at the positions where a higher thermal output is required, it is possible by the method described in more detail hereinafter to adapt the thermal output very flexibly to the circumstances by quite easily producing closer and more cuts or closer revolutions of a spiraled cut. The corresponding tool itself only has to be reprogrammed so as to carry out a different cut.

The conductors 22 are laid substantially at a constant depth t of about 0.1 mm to 3 mm in the foam padding 20 (cf. also FIG. 4).

Figure 3A:
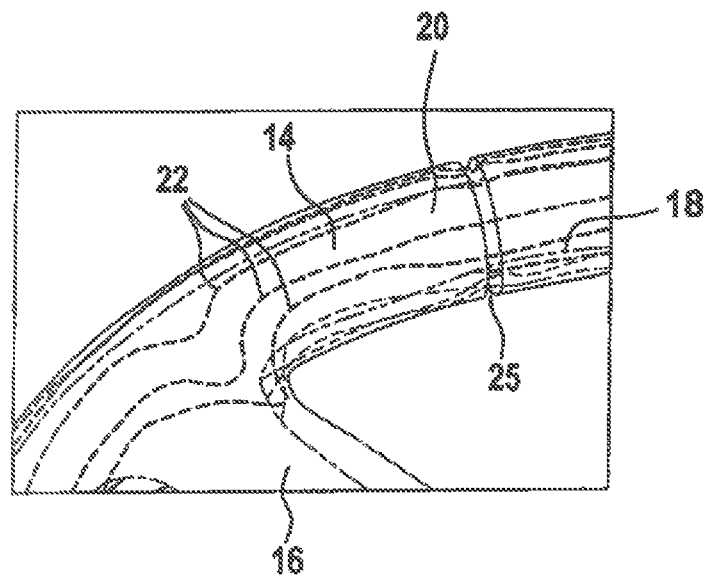
Figure 3B:
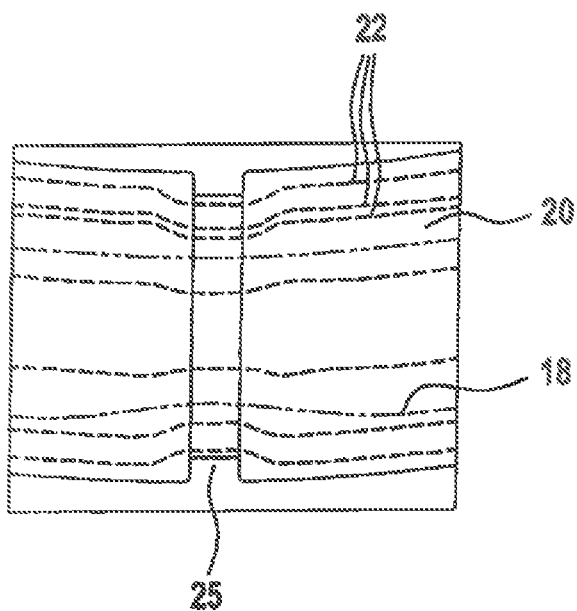

As is evident in FIGS. 3a and 3b, the conductors 22 are inserted slightly deeper merely in the area of recesses 25 for a wrapping (for example a decorating member) of the vehicle steering wheel 10.

As can be seen from FIG. 4, one or more cuts 28 guided substantially radially inwardly from the surface 28 of the foam padding 20 are introduced to the foam padding 20. The conductors 22 are inserted in said cuts 26.

The material of the foam padding 20 is elastic so that, after inserting the conductors 22 and, resp., introducing the cut 26, the cut edges 30 of the cut 26 spring back into a home position in which the out edges 30 are adjacent to each other. The conductors 22 are thus reliably retained in the position within the foam padding 20 and are protected against falling out.

In FIG. 5 a radial cut is shown in a second embodiment of a vehicle steering wheel 10. In this embodiment cuts 26 having two different depths $t_1$ and $t_2$ are provided. The electric conductor 22 thus is laid at two different depths within the foam padding in the steering wheel skeleton 18. In this embodiment initially all windings of a first layer having the depth $t_1$ can be laid and subsequently the windings of a second layer having the depth $t_2$ or else alternately in sections of different depths can be laid.

In FIG. 6, the laying of the electric conductor 22 in the area of the connection 24 is illustrated for an embodiment comprising one conductor 22. The conductor is fixed to the connection 24 by a first end 22a. Subsequently, the windings of the first layer are laid until the electric conductor 22 including an intermediate portion 22b is deflected in loop shape in the area of the connection 24 and the windings of the second layer are laid. Subsequently, the end 22c of the electric conductor 22 is connected to the connection 24 after laying the windings of the second layer.

As an alternative, also two conductors 22 may be provided, a first conductor 28 being laid in the cuts having the first depth $t_1$ and a second conductor 26 being laid in the cuts having the second depth $t_2$.

Figure 7A:
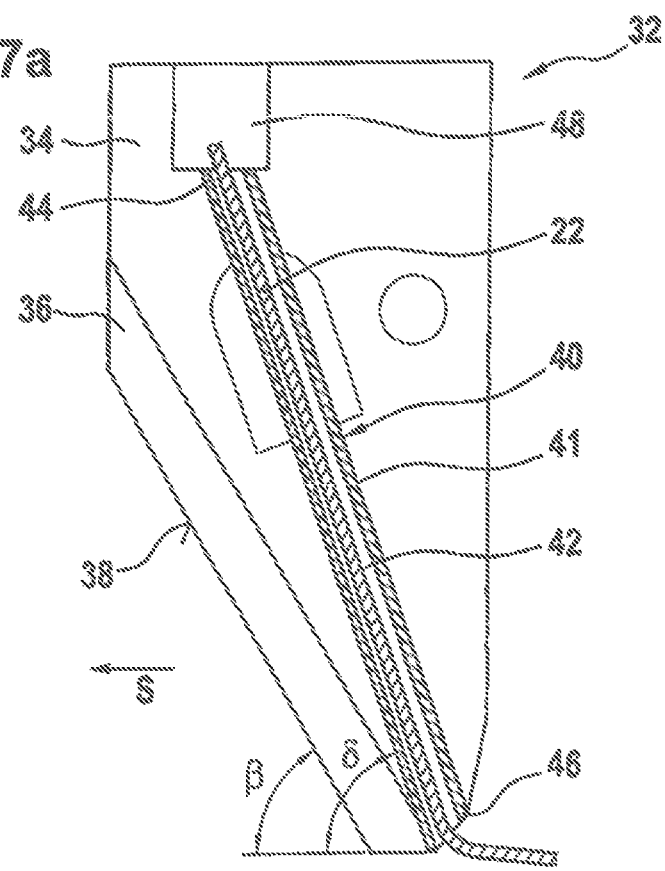
FIGS. 7a and 7b shows a side view as well as a sectional view across a tool according to the invention for introducing an electric conductor to the vehicle steering wheel of FIG. 1, FIGS. 8a to 8c show different views and orientations of a second embodiment of a tool according to the invention for introducing an electric conductor.
Figure 7B:
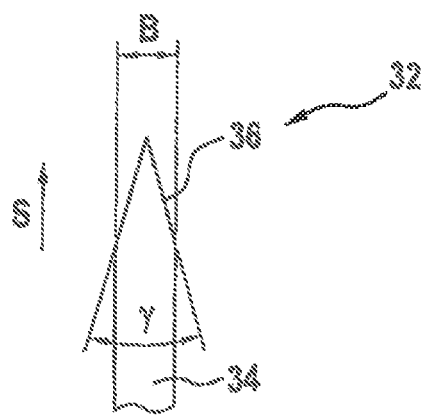
Figure 13C:
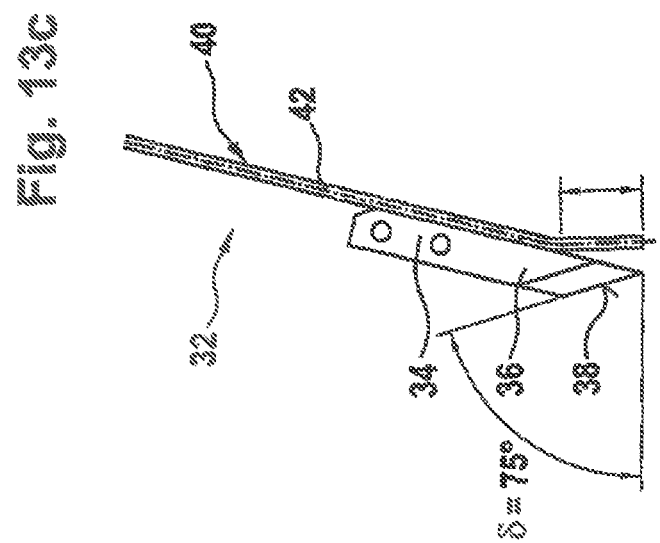
FIGS. 13a to 13c show different views and orientations of a seventh embodiment of a tool according to the invention for introducing an electric conductor.
Figure 13B:
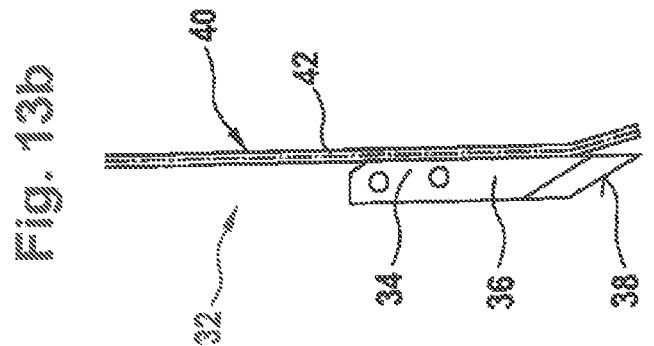
Figure 13A:
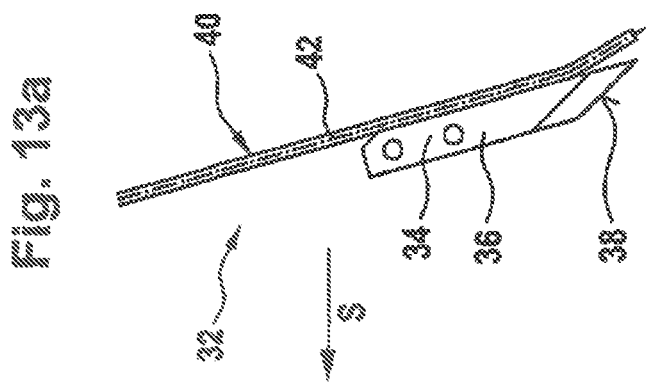

FIGS. 7a and 7b Illustrate a tool 32 according to the invention for facilitating introduction of such conductor 22 into foam padding 20 of a steering wheel skeleton 18.

The tool 32 includes a cutting tool 34 having a cutting means 38 which is formed by a blade in this embodiment. The cutting means 36 includes a cutting edge 38 pointing to the cutting direction S which is V-shaped having a wedge angle y of approx. 30°, as can be inferred from FIG. 6b. The outing means 36 broadens starting from the cutting edge 38 against the cutting direction S up to a width B.

Directly adjacent to the rear side of the cutting edge 38 is provided an inserting tool 40 having an inserting passage 42 defined by a small tube 41. The inserting passage 42 is formed so that a conductor 22 can be pushed through the same. A first end 44 of the inserting passage 42 is arranged so that it is located outside the foam padding 20 when a cut 26 is introduced to the foam padding 20. The second opposite end 46 opens in the cutting direction S just behind the cutting means 38.

In this embodiment the cutting angle β at which the cutting edge 38 is inclined relative to the cutting direction S is about 60°. The angle δ at which the inserting passage 42 extends relative to the cutting direction S amounts to approx. 70°.

For introducing a conductor 22 to the foam padding 20 of a steering wheel skeleton 18 the tool 32 is attached to the surface 28 of the foam padding 20 and the cutting edge 38 is pressed into the foam padding 20 until the desired cutting depth t of 0.1 mm to 3 mm is reached.

After that, the tool 32 is moved in the cutting direction S through the foam padding 20, thus causing a cut 26 to be introduced to the foam padding 20. At the same time, the conductor 22 is introduced through the inserting passage 42 into the out 26 by an active feeding system 48 provided on the tool 32. Preferably the conductor 22 is wound off a supply roller.

Hence introducing the cut 26 and introducing or, resp., inserting the conductor 22 are carried out simultaneously so that the conductor 22 is inserted before the cutting edges 30 of the cut 26 can join each other again.

Since the cut 26 closes directly behind the tool 32, viz. after inserting the conductor 22, the conductor 22 is safely retained within the cut 26.

In addition, the cut 26 may also be closed after introducing the conductor 22, for example by gluing the cutting edges 30 and/or by additional covering. The cut 28 be covered, for example, by further foam padding or wrapping, e.g. made of leather or artificial leather or a decorating element.

Since the conductor 22 is guided via the inserting passage 42 into the out 26, it does not contact the cutting edges 30 so that, on the one band, low-resistance introduction of the conductor 22 is performed and, on the other hand, damage of the cutting edges 30 or the foam padding 20 by the conductor 22 is excluded.

In the embodiment as described herein the width b of the inserting tool 40 to the cutting direction S has been chosen to be smaller than the width B of the cutting means 36 so that no additional resistance is caused by the inserting tool 40 upon introducing the cut 28.

The introduction in the longitudinal direction of the steering wheel rim 18 offers the advantage that the cut(s) 26 can be carried out by an at least three-axle freely programmable industrial robot on which the tool 32 is mounted, without having to stop the tool 32.

The depth of said outs may be monitored, for example, by an appropriate control of the industrial robot or, resp., a tool assembly comprising a tool 32 to the invention and an assembly for pivoting the tool 32.

Figure 16A:
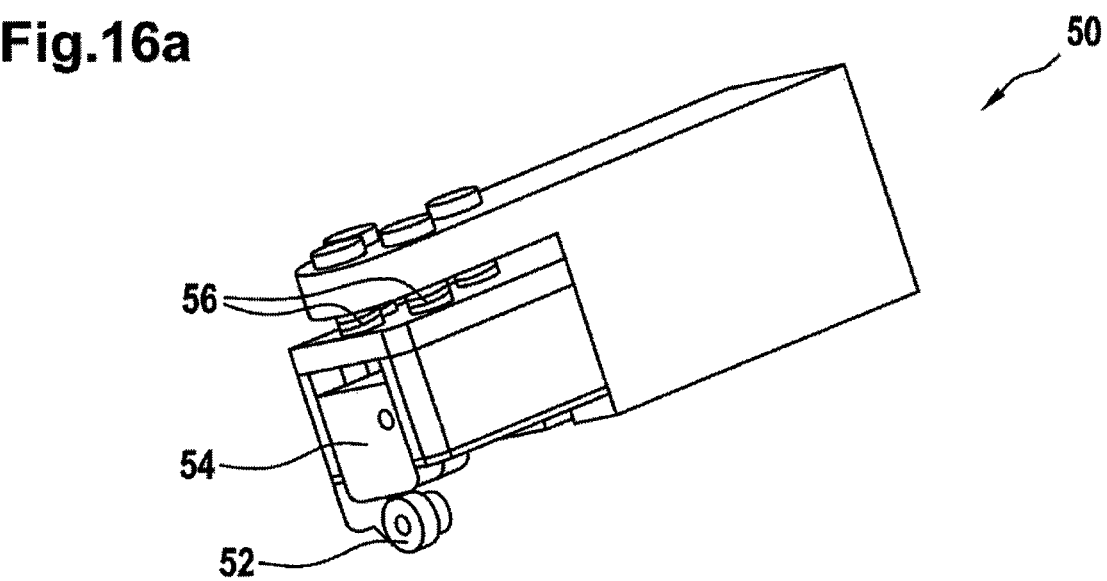
FIGS. 16a to 16b show different views of a positioning assembly for a tool assembly according to the invention for introducing an electric conductor to the vehicle steering wheel of FIG. 1 according to the method of the invention.
Figure 16B:
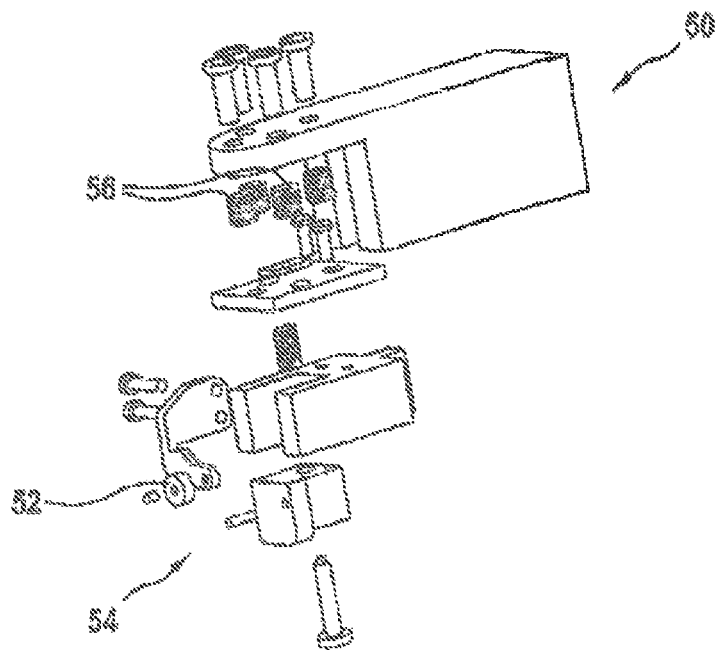

However, it is also possible that such tool assembly additionally includes a positioning tool 50 shown in FIGS. 16a and 16b by which the cut depth is automatically adjusted.

In the embodiment described here the positioning tool 50 includes a guide roller 52 adapted to be adjacent to the surface 28 of the foam padding 20. As afore-mentioned, (alternatively or additionally) also a tactile or sensor-based control may be provided.

The cutting tool 34 is mounted on the positioning tool 50 so that the cutting means 36 exhibits a defined cut depth t when the guide roller 52 contacts the surface 28. For this purpose, the positioning tool 52 includes a tool holder 54 being resiliency supported by means of plural spring elements 56 so that it may yield in the case of increased pressure. This may prevent the tool 32 and, resp., the cutting tool 34 from immersing too deeply into the foam padding 20. Hence it is ensured that the cut 28 is carried out at a constant depth t in the foam padding 20.

The cutting tool 34 and the inserting tool 40 may have any design to introduce the cut 28 into the foam padding 20 and at the same time lay the conductor 22. Furthermore, the blade may also be made to move at ultrasonic speed so as to increase the cutting quality. Instead of a blade, the cutting tool 34 may also include other suitable cutting means 36.

Preferably, the cut 26 is carried out without any material removal of the foam padding 20 so as to ensure that after being introduced into the foam padding 20 and insertion of the conductor 22 the cut 26 may close completely.

Different embodiments of a tool according to the invention are shown in FIGS. 8a to 8c through 14a to 14c. Each of the tools 32 illustrated in said embodiments includes a cutting means 36 having a blade on the rear side of which an inserting passage 42 of an inserting tool 40 is arranged.

The inserting passage 42 is laid in portions on the rear side of the cutting means 36, wherein the second end 46 arranged behind the cutting means 36 is bent away from the cutting tool 34 against the cutting direction S in each case.

The tools 32 shown in FIGS. 8a to 8c, 9a to 9c and 10a to 10c show the same cutting means 38, but they differ by the respective angle α at which the end 46 the inserting passage 42 is bent away from the near side of the cutting means 36. The angle α is between 15° and 45°, wherein the angle α is selected so that the conductor 22 may exit the inserting passage 42 preferably against the cutting direction S, i.e. already at the desired orientation.

Each of the tools 32 illustrated in FIGS. 11a to 11c, 12a to 12c and 13a to 13c has a different shape of the cutting edge 38.

Independently of the shape of the cutting edge 38, the latter may be guided into the foam padding at different angles β relative to the cutting direction S. The angle β preferably ranges from 45° to 75°.

Independently of the shape of the cutting means 36 and, resp., the cutting edge 38, the inserting tool 40 is configured and mechanically tightly coupled to the cutting tool 34 so that the conductor 22 can be introduced to the cut 26 independently of the angle β at the same respective depth t.

Further embodiments of a tool according to the invention are shown in FIGS. 14a to 14c, with the inserting passage 42 having a straight design in each of these embodiments.

In ail embodiments the penetration depth of the inserting passage 42 into the foam padding may be adjusted relative to the deepest point of the cutting edge 38. It is possible in this way that both end at the same depth or at a different depth, as this is most clearly evident from FIGS. 14a to 14c.

Preferably the cutting tool 34 and, resp., the cutting edge 38 protrudes from the inserting passage 42 perpendicularly to the cutting direction S by a precutting depth so that behind the cut a larger free space is provided into which the electric conductor may be inserted. Said precutting depth preferably ranges torn 0.1 mm to 2 mm.

It is also imaginable to design the tool 32 so that said precutting depth is individually adjustable, especially also during the cutting and laying operation. This may be performed via tool control.

Figure 15:
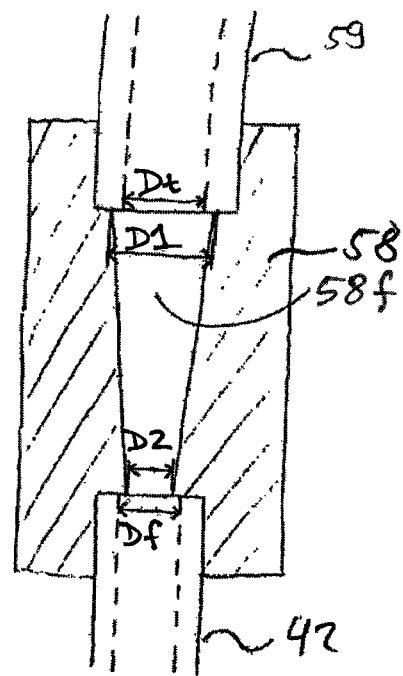
FIG. 15 shows a detailed view of an inserting aid for a tool according to the invention.

FIG. 15 illustrates an insertion aid 58 which facilitates threading of the electric conductor 22 into the inserting tool 40. The insertion aid 58 substantially has a conical guide 58f which is connected to the guide passage 42 of the inserting tool 40 and the diameter of which is tapered from an insertion-side diameter D1 to an exit diameter D2 which is larger than or equal to the diameter Df of the guide passage 42. Of preference, there is further provided a Teflon hose 59 having an inner diameter Dt (Dt is larger than or equal to D1) within which the electric conductor 22 is guided with low friction. The insertion aid 58 may be permanently arranged on the tool head 61 (FIG. 17).

The cutting tool 34 may as well include other cutting means 36, for example including a cutting wire.

It has merely to be ensured that the inserting tool 40 is coupled to the cutting tool 34 and the inserting tool 40 is directly adjacent to the cutting means 36 against the cutting direction so as to introduce the conductor 22 simultaneously with the cut 26 into the foam padding 20.

Figure 17:
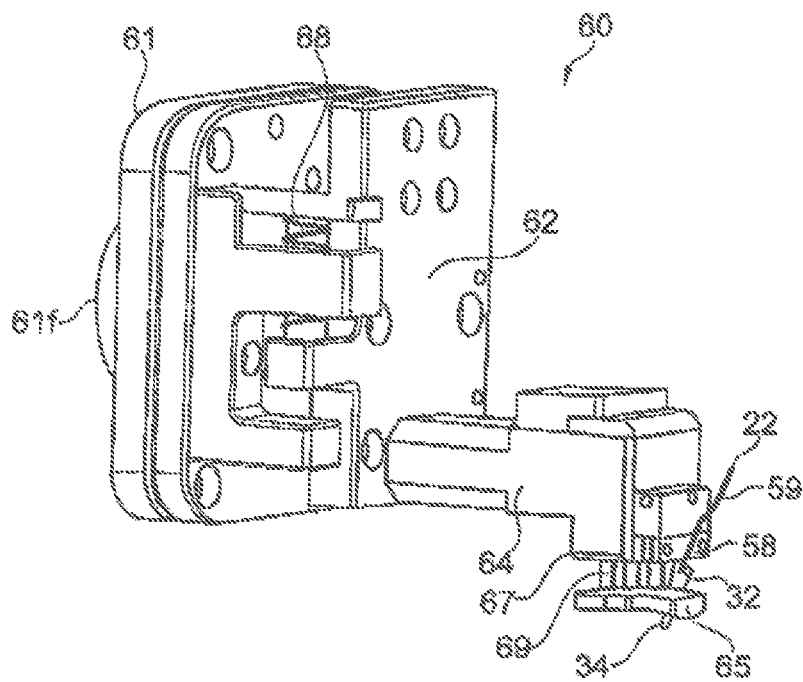
FIG. 17 shows a view of a tool assembly according to the invention.

In FIG. 17 a tool head 61 is shown as cutout of a tool assembly 60 in the area of a tool according to the invention.

The tool assembly 60 comprises two at least three-axle industrial robots not shown in detail here. On a first industrial robot the tool 32 is retained in the tool head 61. The tool head is attached to the first industrial robot by means of a retaining flange 61f. On the second industrial robot the foam-padded steering wheel skeleton 18 is retained. The steering wheel skeleton 18 and the tool 32 may be positioned and moved arbitrarily relative to each other so that even complicated cuttings are possible.

A pressing device 62 on which the tool 32 is retained is provided on the tool head 61 held on the first industrial robot. Said pressing device 62 ensures the tool 32 be pressed against the foam-padded steering wheel skeleton at a constant pressure and uniform cutting to be safeguarded.

The pressing device 62 includes a guide means 64 associated with the cutting tool 34 and having a guide shoe 65. The guide means 64 further includes an actuating mechanism 87, in this case a cylinder adapted to adjust the guide shoe 65 relative to the cutting tool so that only the length of the cutting tool 34 required for the respective desired cut depth t protrudes from the guide shoe 65.

The pressing device 62 presses the guide means 64 and, resp., the guide shoe 65 and thus the tool 32, for example in a spring-loaded manner, against the surface of the foam padding 20 of the steering wheel skeleton 18 so that the tool 32 cuts into the foam padding 20 at the desired and adjusted length.

Preferably the maximum cutting depth t adapted to be adjusted amounts to 8 mm, especially to 6 mm.

The depth of cut t preferably may be adjusted during the cutting operation so that also various inserting depths can be realized.

For more complicated cuttings, especially in intersecting areas of the heating wires, it is also possible to lock the pressing device 62.

The tool head 61 includes a tolerance compensating means 68 ahead of the retaining flange 61f so as to compensate for possible steering wheel tolerances in the rim profile.

The tool 32, especially the cutting blade 34, is surrounded by the guide shoe 85 in the form of a sliding shoe being connected to a cylinder-piston system 69. The latter may withdraw the sliding shoe by command and expose a maximum blade length. A blade used in this embodiment then allows for a maximum depth of cut of 6 mm and an inserting depth of 5 mm, for example.

In the primary inserting area (steering wheel rim) the sliding shoe 65 is extended by the cylinder-piston system 69, as shown in FIG. 17, and in this way allows for a small inserting depth of the electric conductor. Preferably the conductor/wire then is located within the foam at a depth of 0.1 mm to 2 mm.

In particular areas (such as leather grooves, design edges, finger recesses, cover transition, crossing points etc.) the wire/conductor deliberately has to be laid more deeply into the foam. This is done by the cylinder-piston system withdrawing the sliding shoe 65 and exposing the maximum blade length 34.

At the same time, the tolerance compensation 68 is frozen (currently by a pneumatic brake) and the robot traces the particular areas by numeric control ("CNC") while maintaining the preliminary tolerance offset of the rim profile.

When the particular area has been machined and the primary inserting area is reached again, the cylinder-piston system (69) returns the sliding shoe 65 into the home position and the tolerance compensation is released or, resp., activated again.

The blade 34 is fastened via force and form closure as well as connected to the feed line (e.g. a Teflon hose 59) by an adapter/inserting aid 58. The adapter 58 for easy threading of the electric conductor. The wire feeding system 59 the electric conductor to be fed undisturbed at low friction.

Figure 18:
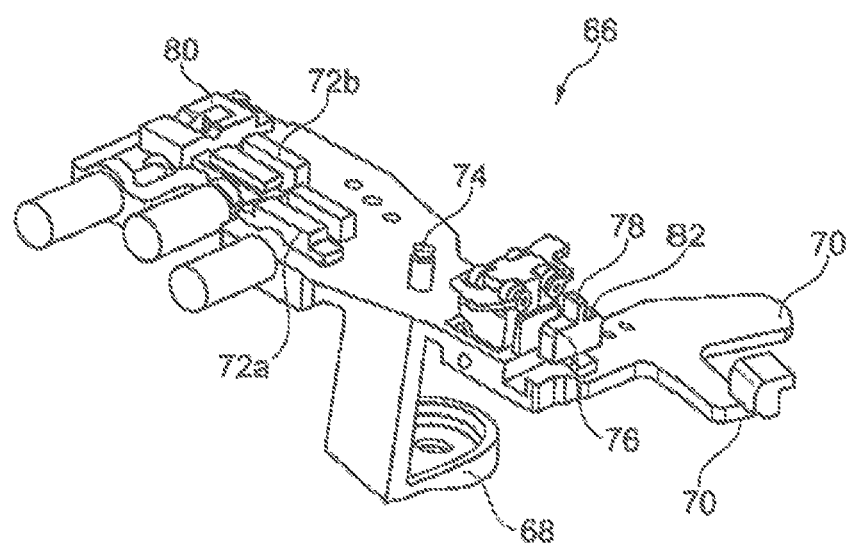
FIG. 18 shows a view of a positioning means of a tool assembly according to the invention.

In FIG. 18 further a positioning means 66 is illustrated. The positioning means 66 permits facilitated laying of the electric conductor 22 by fixing within the same the start 22a, the end 22c and/or intermediate portions 22b of the electric conductor 22 (cf. FIG. 6) during the method according to the invention.

The positioning means 66 includes a fastening device 68 as well as a plurality of positioning aids 70 so as to fix the positioning means 66 to the steering wheel skeleton 18.

Moreover, retaining devices 72a, 72b for the start 22a and, resp., the end 22c of the electric conductor 22, plural guide elements 74, 76 as well as a seat 78 for the electric connection 24 are provided on the steering wheel skeleton 18.

At the beginning of the method, the positioning means 66 is fixed and aligned with the fastening device 68 and the positioning aids 70 on the steering wheel skeleton. Subsequently the start 22a of the electric conductor 22 is fixed to the retaining device 72a.

After said steps the cuts of a first layer of windings are introduced to the steering wheel skeleton 18 and the electric conductor 22 is introduced into the same. Subsequently, the electric conductor 22 is guided around the guide element 74 in the form of a deflecting pin and the windings of a second layer are introduced to the steering wheel skeleton.

After introducing the cots 28 and laying the electric conductor 22, the end 22c of the electric conductor 22 is fixed in the second retaining device 72b and is cut off, for example, by a given cutting tool 80.

Finally the electric conductor 22 is connected to the connection 24 retained in the seat 78, wherein the guide element 76 serves as hold-down for preventing the electric conductor 22 from being pulled out of the foam padding 20.

An assembling aid 32 assists the exact orientation of the connection 24 as well as connecting the electric conductor 22.

After implementing the method and connecting the electric conductor 22 the positioning means 66 may be removed from the steering wheel skeleton 18.

After laying and connecting the electric conductor 22, it may be strongly heated so that the adjacent foam is softened and/or liquefied for a short time and after cooling is glued to the electric conductor 22. This causes permanent fixation of the conductor 22 within the foam padding of the steering wheel skeleton.

As an alternative, the electric conductor may include a thin thermoplastic adhesive coating which may be activated by means of current supply/heating. By heating the adhesive the cutting edge can moreover be closed again.

The invention claimed is:

1. A method of introducing an electric conductor (22) into foam padding (20) of a steering wheel skeleton (18) comprising the following steps of:
   introducing cut (26) into the foam padding (20) by means of a cutting tool (34) during a first method step, the foam padding (20) having an initial shape, and
   simultaneously introducing the electric conductor (22) into the cut (26) during a second method step at a location that is offset from a point where the cut is being introduced, the offset of the location being a distance where the electrical conductor is introduced into the cut before the cut foam padding returns to the initial shape.

2. The method according to claim 1 wherein the cut (26) automatically closes, is closed, and/or covered after inserting the conductor (22).

3. The method according to claim 1, wherein after introducing the conductor (22) the foam padding (20) is covered by further foam padding or wrapping.

4. The method according to claim 1, wherein after being introduced into the cut (26), the conductor (22) is integrally connected to the foam padding (20).

5. The method according to claim 1, wherein the cut (26) substantially extends in the circumferential direction around the steering wheel hub (12) along the steering wheel rim (14).

6. The method according to claim 1, wherein the cut (26) has a depth of at least 0.1 mm.

7. The method according to claim 1, wherein the cut (26) is guided along the steering wheel rim (14) in plural revolutions about the steering wheel hub (12) so that a substantially spiraled cut (26) is produced and the conductor (22) extends in plural windings and/or that in the case of intersecting cuts the cutting depths are different in the point of intersection.

8. The method according to claim 1, wherein the cut (26) and the introduction of the conductor (22) are implemented by means of a tool (32) being mounted on a programmable industrial robot that can move the tool (32) three-dimensionally in space.

9. The method according to claim 8, wherein the steering wheel skeleton (18) is held on a second programmable industrial robot that can move the steering wheel skeleton (18) three-dimensionally in space.

10. The method according to claim 1, wherein a tool (32) implements the steps of introducing cut and simultaneously introducing the electric conductor, the tool including a cutting tool (34) having a cutting means (36) which includes a cutting edge (38) pointing to the cutting direction (S) as well as an inserting tool (40) for the conductor (22), wherein the cutting tool (34) and the inserting tool (40) are coupled to each other.

11. The method according to claim 10, wherein the width (b) of the inserting tool (40) perpendicularly to the cutting direction (S) is smaller than or equal to the width (B) of the cutting means (36).

12. The method according to claim 10 wherein the inserting tool (40) includes an inserting passage (42) through which the conductor (22) can be guided, the inserting passage (42) ending in the cutting direction (S) behind the cutting means (36) of the cutting tool (34).

13. The method according to claim 10, wherein the cutting tool (34) protrudes perpendicularly to the cutting direction (S) at a precutting depth from the inserting tool (40), the precutting depth ranging from 0.1 mm to 2 mm.

14. The method according to claim 10, wherein the inserting tool (40) includes a conically tapering guide within an inserting aid (58) of the electric conductor (22).

15. The method according to claim 10, wherein the cutting means (36) is a blade and/or an ultrasonic cutting tool.

16. The method according to claim 10, wherein a pressing device (62) is provided which is adapted to load the tool (32) with a defined force against the steering wheel skeleton (18), the pressing device being configured to compensate for tolerances in the steering wheel skeleton.

17. The method according to claim 10, wherein the cutting tool (34) comprises a separate guide means (64) for adjusting the cutting depth.

18. The method according to claim 17, wherein the guide means (64) comprises a guide shoe adapted to contact the steering wheel skeleton (18), wherein the cutting means (36) protrudes from said guide shoe (65) into the steering wheel skeleton.

19. The method according to claim 18, wherein the guide means (64) comprises an actuating mechanism (67) which is adapted to move the guide shoe (65) relative to the cutting means (36).

20. The method according to claim 1 wherein a positioning means (66) for the electric conductor (22) is provided which may be positioned on the steering wheel skeleton (18) and includes a seat (78) for an electric connection (24) arranged on the steering wheel skeleton (18) for the electric conductor (22) as well as retaining elements (72a, 72b) for the start (22a) and the end (22c) of the electric conductor (22).

21. The method according to claim 20, wherein the positioning means (66) includes guide elements (74, 76) for the electric conductor (22).

22. The method according to claim 20 wherein the positioning means (66) includes a fastening device (68) and positioning aids (70) for fixing the positioning means (66) to the steering wheel skeleton (18).

23. The method according to claim 1, wherein the steering wheel skeleton (18) includes a steering wheel rim (14) foam-padded by the foam padding (20) the electric conductor (22) being located in the cut that is introduced to the foam padding (20).

24. The method according to claim 23, wherein the conductor is permanently fixed in the foam padding (20).

25. The method according to claim 23 wherein the cut (26) extends substantially in the circumferential direction around the steering wheel hub (12) along the steering wheel rim.

26. The method according to claim 23, wherein a first layer of windings of the electric conductor (22) is laid at a first depth ($t_1$) and a second layer of windings of the electric conductor (22) is laid at a second depth ($t_2$).

27. The method according to claim 23, wherein the cut (26) includes points of intersection of portions of the cut, wherein in the area of the points of intersection one of the intersecting portions of the cut (26) has a larger depth (t) and in this portion of the cut (26) the electric conductor is inserted more deeply than in the overlying portion.

28. The method according to claim 23, wherein the foam padding (20) is covered at least in the area of the cut (26) by further foam padding or wrapping.

* * * * *